(12) United States Patent
Jiang

(10) Patent No.: US 10,969,904 B2
(45) Date of Patent: Apr. 6, 2021

(54) NOISE DETECTING METHOD AND APPARATUS, ELECTRONIC DEVICE, AND COMPUTER READABLE STORAGE MEDIUM

(71) Applicant: SHENZHEN GOODIX TECHNOLOGY CO., LTD., Shenzhen (CN)

(72) Inventor: Haikuan Jiang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 47 days.

(21) Appl. No.: 16/455,650

(22) Filed: Jun. 27, 2019

(65) Prior Publication Data

US 2019/0317637 A1  Oct. 17, 2019

Related U.S. Application Data

(63) Continuation of application No. PCT/CN2017/119057, filed on Dec. 27, 2017.

(51) Int. Cl.
*G06F 3/041* (2006.01)
*G06F 3/044* (2006.01)

(52) U.S. Cl.
CPC .......... *G06F 3/0418* (2013.01); *G06F 3/044* (2013.01)

(58) Field of Classification Search
CPC .... G06F 3/0418; G06F 3/044; G06F 3/04182; G06F 3/0416; G06F 3/0441; G06F 3/0446; G06F 3/041
See application file for complete search history.

(56) References Cited

U.S. PATENT DOCUMENTS 6,544,478 B1 *  4/2003  Oyama .................. G01G 3/13
                                                         422/68.1
8,294,687 B1 * 10/2012  Ksondzyk ............ G06F 3/0418
                                                         345/173
(Continued)

FOREIGN PATENT DOCUMENTS

CN      102707821 A      10/2012
CN      102788910 A      11/2012
CN      107003783 A      8/2017

OTHER PUBLICATIONS

The Chinese International Search Report of corresponding international application No. PCT/CN2017/119057, dated Sep. 25, 2018.
(Continued)

*Primary Examiner* — Amy Onyekaba
(74) *Attorney, Agent, or Firm* — J.C. Patents

(57) ABSTRACT

The present application discloses a noise detecting method and apparatus, and an electronic device, the method includes: obtaining a noise of each sensing electrode of a plurality of sensing electrodes of a touch screen at a current operating frequency point during an operation of the touch screen; calculating a difference between the noise of the sensing electrode and a current noise reference of the sensing electrode to obtain a noise difference of the sensing electrode; performing differential processing on the noise differences of the sensing electrode and a noise difference of an adjacent sensing electrode of the sensing electrode, to obtain a first processing result comprising a plurality of values, and comparing a maximum value of the first processing result with a preset first threshold; if the maximum value is greater than the threshold, determining that there is noise interference at the current operating frequency point.

18 Claims, 10 Drawing Sheets

(56) References Cited

U.S. PATENT DOCUMENTS

| | | | | |
|---|---|---|---|---|
| 9,244,550 B2* | 1/2016 | Singh | | G06F 3/041 |
| 9,411,928 B2* | 8/2016 | Karpin | | G06F 3/044 |
| 9,444,452 B2* | 9/2016 | Ksondzyk | | H03K 17/955 |
| 9,547,400 B2* | 1/2017 | Waldron | | G06F 3/0412 |
| 9,557,868 B2* | 1/2017 | Agarwal | | G06F 3/0446 |
| 9,600,121 B2* | 3/2017 | Stevenson | | G06F 3/04184 |
| 9,811,181 B2* | 11/2017 | Shah | | G06F 3/03545 |
| 9,864,466 B2* | 1/2018 | Goudarzi | | G06F 3/0412 |
| 10,444,892 B2* | 10/2019 | Portmann | | H03K 17/962 |
| 2005/0170405 A1* | 8/2005 | Utsunomiya | | G01N 27/3276 |
| | | | | 435/29 |
| 2009/0322336 A1* | 12/2009 | Zhao | | G01V 3/24 |
| | | | | 324/333 |
| 2011/0210939 A1* | 9/2011 | Reynolds | | G06F 3/0412 |
| | | | | 345/174 |
| 2011/0261007 A1* | 10/2011 | Joharapurkar | | G06F 3/04166 |
| | | | | 345/174 |
| 2013/0221993 A1* | 8/2013 | Ksondzyk | | H03K 17/955 |
| | | | | 324/681 |
| 2014/0022203 A1* | 1/2014 | Karpin | | G01R 27/2605 |
| | | | | 345/174 |
| 2014/0085235 A1* | 3/2014 | Tokita | | G02F 1/1368 |
| | | | | 345/173 |
| 2014/0132525 A1* | 5/2014 | Pyo | | G06F 3/0412 |
| | | | | 345/173 |
| 2014/0225856 A1* | 8/2014 | Shepelev | | G06F 3/046 |
| | | | | 345/174 |
| 2015/0077402 A1* | 3/2015 | Ye | | G06F 3/04184 |
| | | | | 345/178 |
| 2015/0103042 A1* | 4/2015 | Lee | | G06F 3/0418 |
| | | | | 345/174 |
| 2015/0123677 A1* | 5/2015 | Ding | | G06F 3/0446 |
| | | | | 324/613 |
| 2015/0123950 A1* | 5/2015 | Ding | | G06F 3/0446 |
| | | | | 345/178 |
| 2015/0153868 A1* | 6/2015 | Tiew | | G06F 3/04166 |
| | | | | 345/174 |
| 2015/0277660 A1 | 10/2015 | Yang et al. | | |
| 2016/0147319 A1* | 5/2016 | Agarwal | | G06F 3/0418 |
| | | | | 345/173 |
| 2016/0253001 A1* | 9/2016 | Sugita | | G06F 3/04166 |
| | | | | 345/174 |
| 2017/0046005 A1* | 2/2017 | Monson | | G06F 3/0446 |
| 2017/0090609 A1* | 3/2017 | Petrovic | | G06F 3/04182 |
| 2017/0090668 A1* | 3/2017 | Agarwal | | G06F 3/044 |
| 2017/0192554 A1* | 7/2017 | Khazeni | | G06F 3/041 |
| 2018/0217713 A1* | 8/2018 | Bye | | G06F 3/04184 |
| 2019/0042056 A1* | 2/2019 | Monson | | G06F 3/0383 |
| 2020/0257429 A1* | 8/2020 | Hisano | | G06F 3/04162 |

OTHER PUBLICATIONS

The extended European Search Report of corresponding European application No. 17 93 5050, dated Nov. 25, 2019.

* cited by examiner

| Ref_I₁ | Ref_I₂ | Ref_I₃ | Ref_I₄ | Ref_I₅ | Ref_I₆ | Ref_I₇ | Ref_I₈ |
|---|---|---|---|---|---|---|---|
| Ref_Q₁ | Ref_Q₂ | Ref_Q₃ | Ref_Q₄ | Ref_Q₅ | Ref_Q₆ | Ref_Q₇ | Ref_Q₈ |

FIG. 6A

| Raw_I₁ | Raw_I₂ | Raw_I₃ | Raw_I₄ | Raw_I₅ | Raw_I₆ | Raw_I₇ | Raw_I₈ |
|---|---|---|---|---|---|---|---|
| Raw_Q₁ | Raw_Q₂ | Raw_Q₃ | Raw_Q₄ | Raw_Q₅ | Raw_Q₆ | Raw_Q₇ | Raw_Q₈ |

FIG. 6B

NOISE DETECTING METHOD AND APPARATUS, ELECTRONIC DEVICE, AND COMPUTER READABLE STORAGE MEDIUM

CROSS-REFERENCE TO RELATED APPLICATION

The present application is a continuation of International Application No. PCT/CN2017/119057, filed on Dec. 27, 2017, the content of which is incorporated herein by reference in its entirety.

TECHNICAL FIELD

The present application relates to the field of touch-control and, in particular, to a noise detecting method and apparatus, an electronic device, and a computer readable storage medium.

BACKGROUND

Touch screen, which is also known as "touch-control screen" or "touch-control panel", is a liquid crystal display apparatus that can receive input signals in a sensing way, it can be used to replace a mechanical button panel and create a vivid video and audio effect through a liquid crystal display. The touch screen realizes a simple, convenient and natural human-computer interaction mode, and electronic devices such as mobile phones, tablet computers, and personal computers are inseparable from touch input functions.

As a kind of touch screen, a capacitive touch screen works by a current sensing of a human body, and realizes a touch-control by identifying a change of a capacitance generated when a finger approaches the capacitive touch-control panel. At present, the capacitive touch screen has been widely used in today's society. However, in the field of touch-control, the touch screen may be interfered by many different noise sources during use, for example, an influence generated by a common mode noise interference is particularly significant, which may cause false clicks or elimination clicks, thereby seriously affecting a user experience. Therefore, how to effectively identify and reduce noise interference becomes a problem that needs to be solved currently.

SUMMARY

The present application provides a noise detecting method and apparatus, an electronic device, and a computer readable storage medium, which are used to accurately identify current noise interference.

A first aspect of the present application is to provide a noise detecting method, including: obtaining noises of sensing electrodes of a touch screen at a current operating frequency point during an operation of the touch screen; calculating a difference between a noise of each sensing electrode and a current noise reference of that sensing electrode to obtain noise differences of the sensing electrodes; performing differential processing on adjacent sensing electrodes for the noise differences of the sensing electrodes to obtain a first processing result, and comparing a maximum value of the first processing result with a preset first threshold; if the maximum value is greater than the threshold, determining that there is noise interference at the current operating frequency point.

A second aspect of the present application is to provide a noise detecting apparatus, including: an obtaining module, configured to obtain noises of sensing electrodes of a touch screen at a current operating frequency point during an operation of the touch screen; a processing module, configured to calculate a difference between a noise of each sensing electrode and a current noise reference of that sensing electrode, obtain noise differences of the sensing electrodes; the processing module is further configured to perform differential processing on the noise differences of the sensing electrodes for adjacent sensing electrodes to obtain a first processing result, and compare a maximum value of the first processing result with a preset first threshold; a determining module, configured to determine that there is noise interference at the current operating frequency point if the maximum value is greater than the threshold.

A third aspect of the present application is to provide an electronic device, including: at least one processor and a memory; where the memory stores computer-executable instructions, and the at least one processor executes the computer-executable instructions stored in the memory, to perform the method described above.

A fourth aspect of the present application is to provide a computer readable storage medium, which has program instructions stored therein, where the program instructions, when executed by a processor, perform the method described above.

The noise detecting method and apparatus, the electronic device, and the computer readable storage medium provided by the present application, obtain the noises of the sensing electrodes of the touch screen at the current frequency point during the operation of the touch screen, obtain the noise differences of the sensing electrodes by calculating the difference between the noise of the sensing electrode and the corresponding noise reference, and further perform adjacent differential processing on the noise differences of the sensing electrodes to obtain the processing result, and thus determine whether there is noise interference currently according to whether the maximum value of the processing result exceeds the preset threshold. In the process of identifying noise interference, the solution can eliminate an influence of signal differences between the sensing electrodes by introducing the noise references, thereby more accurately reflecting actual noises. Moreover, the solution can eliminate an influence of a direct current component in a demodulation process by performing the adjacent differential calculation on the noise differences, thereby improving an accuracy of the noise detection.

BRIEF DESCRIPTION OF THE DRAWINGS

In order to more clearly illustrate technical solutions in embodiments of the present application, the drawings used in the description of the embodiments will be briefly introduced below. Obviously, the drawings in the following description are only some embodiments of the present application, and those skilled in the art can also obtain other drawings according to the drawings.

FIG. 6A is a schematic diagram of noise references of sensing electrodes in a fifth embodiment of the present application;

FIG. 6B is a schematic diagram of noises of the sensing electrodes in the fifth embodiment of the present application.

DETAILED DESCRIPTION OF THE EMBODIMENTS

In order to make the purpose, technical solutions and advantages of the embodiments of the present application clearer, the technical solutions in the embodiments of the present application are clearly and completely described in the following with reference to the accompanying drawings in the embodiments of the present application. Obviously, the described embodiments are part of the embodiments of the present application, and not all of the embodiments. All other embodiments obtained by those skilled in the art based on the embodiments in the present application are within the protection scope of the present application.

Unless defined otherwise, all technical and scientific terms used herein have the same meaning as commonly understood by those skilled in the art. The terms used herein are for the purpose of describing particular embodiments, but not intended to limit the present application. The term "and/or" as used herein includes any and all combinations of one or more of the associated listed items. Some embodiments of the present application are described in detail below with reference to the accompanying drawings. In the case of no conflict, the following embodiments and features in the embodiments can be combined with each other.

Figure 1:
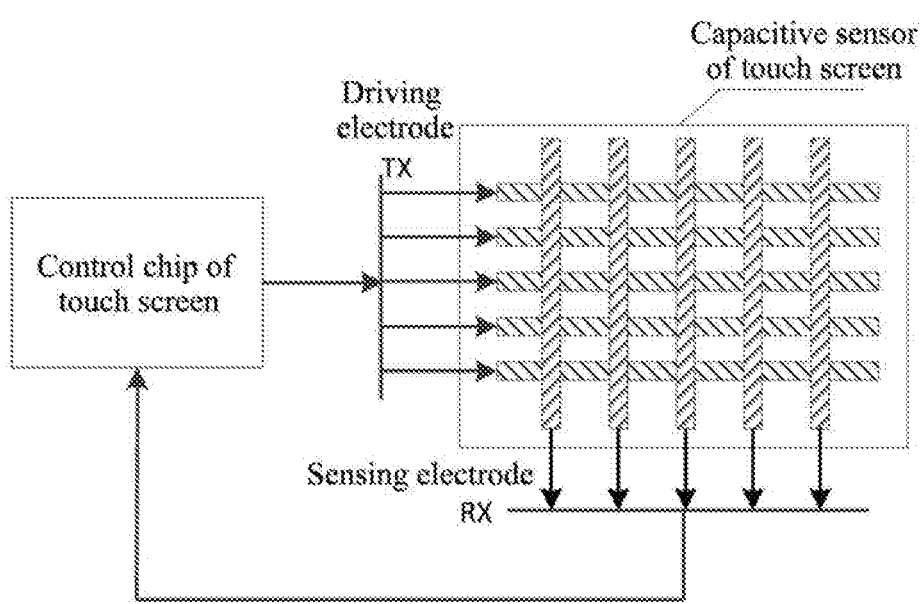
FIG. 1 is a schematic structural diagram of a capacitive touch screen to which a noise detecting method provided by the present application is applicable.

As shown in FIG. 1, a capacitive sensor of a capacitive touch screen generally consists of driving electrodes (TXs) and sensing electrodes (RXs). A touch control chip inputs a driving signal of a certain operating frequency into the driving electrodes, the signal returns to the touch control chip through the capacitive sensor via the sensing electrodes, finally, after an analog-to-digital converter (ADC) conversion and digital signal processing inside the touch control chip, capacitance changes of capacitive sensing nodes can be analyzed, so as to realize touch-control identification.

In practical applications, when a finger performs a touch-control operation on the touch screen, some noise interference, such as common mode noise, may be introduced based on influence of many factors. Common mode noise usually exists at a position touched by a finger, and the common mode noise is small in an area where the finger does not touch. In order to reduce the noise interference, it is necessary to collect signals from the sensing electrodes of the touch screen, and process and analyze the signals to identify a currently existing noise, and then adopt a noise reduction solution. If the noise is not accurately identified, a final noise reduction effect will be seriously affected.

Figure 2A:
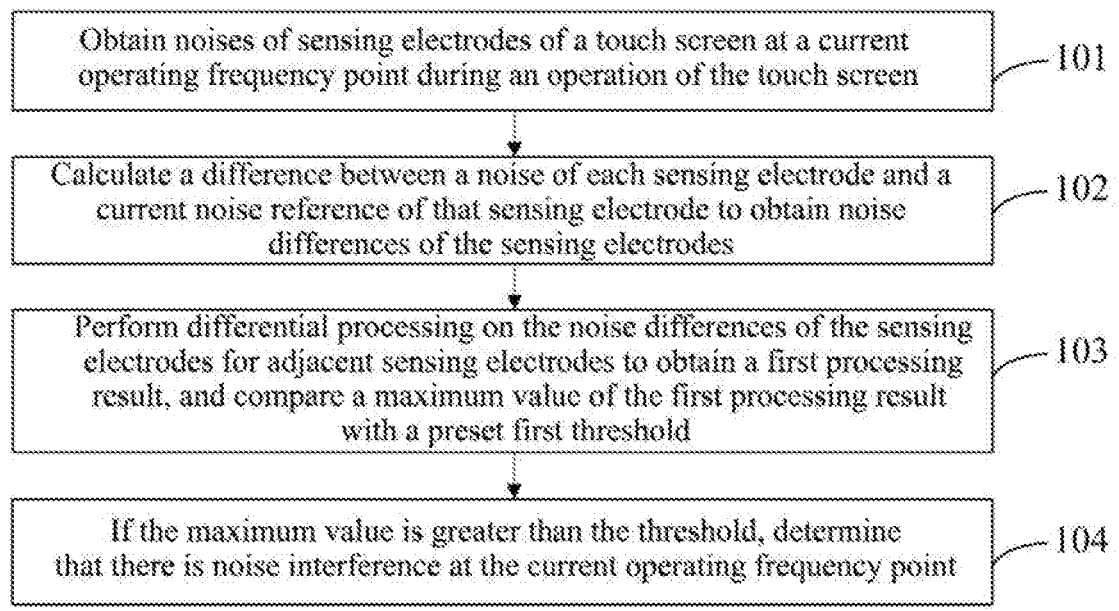
FIGS. 2A-2C are schematic flowcharts of a noise detecting method according to a first embodiment of the present application.

Based on the above requirement, FIG. 2A is a schematic flowchart of a noise detecting method according to a first embodiment of the present application. Referring to FIG. 2A, the present embodiment provides a noise detecting method, the noise detecting method is configured to accurately identify a current noise, and specifically, the noise detecting method includes:

101: obtain noises of sensing electrodes of a touch screen at a current operating frequency point during an operation of the touch screen;

102: calculate a difference between a noise of each sensing electrode and a current noise reference of that sensing electrode to obtain noise differences of the sensing electrodes;

103: perform differential processing on the noise differences of the sensing electrodes for adjacent sensing electrodes to obtain a first processing result, and compare a maximum value of the first processing result with a preset first threshold; and 104: if the maximum value is greater than the threshold, determine that there is noise interference at the current operating frequency point.

Specifically, an execution body of the noise detecting method can be a noise detecting apparatus. In practical applications, the noise detecting apparatus can be implemented by software codes, the noise detecting apparatus may also be a medium stored with an associated execution code, for example, a USB flash drive or the like. Alternatively, the noise detecting apparatus may also be a physical device integrated or installed with relevant execution codes, for example, chips, smart terminals, computers, and various electronic devices.

In practical applications, common mode noise is usually introduced by finger touch, which is characterized by the fact that a noise signal introduced into one or two sensing electrodes is significant, while a noise introduced into other non-touch areas is not significant. However, during a noise detecting process, a polarity of a voltage of a liquid crystal display (LCD) under the touch screen is reversed, and a direct current component signal is generated on an entire column of sensing electrodes in the upper touch screen, the direct current component signal will affect an accuracy of the noise detection result. In this solution, by obtaining the noises of the sensing electrodes during normal operation of the touch screen, obtaining the noise differences of the sensing electrodes based on the noise references, performing adjacent differential processing on the noise differences of the sensing electrodes, the influence of the direct current component can be eliminated, and the accuracy of noise detecting can be improved.

In addition, the noise detecting method provided by this solution can be triggered in various ways. For example, the noise detection solution can be performed periodically according to a preset period, for example, it can be set to perform a noise detection every time a touch-control scan is performed, so as to achieve continuous and stable noise detection, thereby ensuring stability and reliability of the noise detection.

Specifically, this solution first needs to obtain the noises of the sensing electrodes. In this solution, there are various implementation scenarios for obtaining the noises of the sensing electrodes. One scenario is an initial scenario (before driving the touch screen for the first time), that is, noises of the sensing electrodes in an initial state are obtained before a driving signal is input into the touch screen for the first time, and the noises will be used as the initial noise references. Another scenario is during a normal operation of the touch screen, that is, the noises of the sensing electrodes are obtained during a process of inputting the driving signal to the touch screen. Subsequently, it is needed to implement the noise detection through a series of processing based on the noises and noise references. In other words, the scenarios for obtaining the noises of the sensing electrodes are different, and processes performed on the noises will be different. Specifically, the noises of the sensing electrodes obtained before driving the touch screen for the first time will be taken as the initial noise references; the noises of the sensing electrodes obtained during the operation of the touch screen will be used for noise detection.

Correspondingly, in order to determine the initial noise references, on the basis of the first embodiment, before the driving signal is input into the touch screen in 101, the method may further include:

obtain noises of the sensing electrodes of the touch screen at the current operating frequency point before the touch screen is driven for a first time, which are taken as the current noise references of the sensing electrodes.

The frequency point described in this solution refers to a frequency of a driving signal used to drive the touch screen, and the operating frequency point is a frequency of the driving signal currently used to drive the touch screen to operate. Specifically, in the process of obtaining the noises, it is needed to perform demodulation on the signals sampled from the sensing electrodes, therefore, the noises at the certain frequency point as described in the embodiments of this solution refers to noises finally obtained after the demodulation processing using a demodulation signal whose signal frequency is consistent with the frequency point, that is, noises at the frequency point.

According to this embodiment, the initial noise references are determined, and accurate noise detection is achieved subsequently based on the noises of the sensing electrodes obtained in the process of inputting the driving signal and the noise references.

Figure 2B:
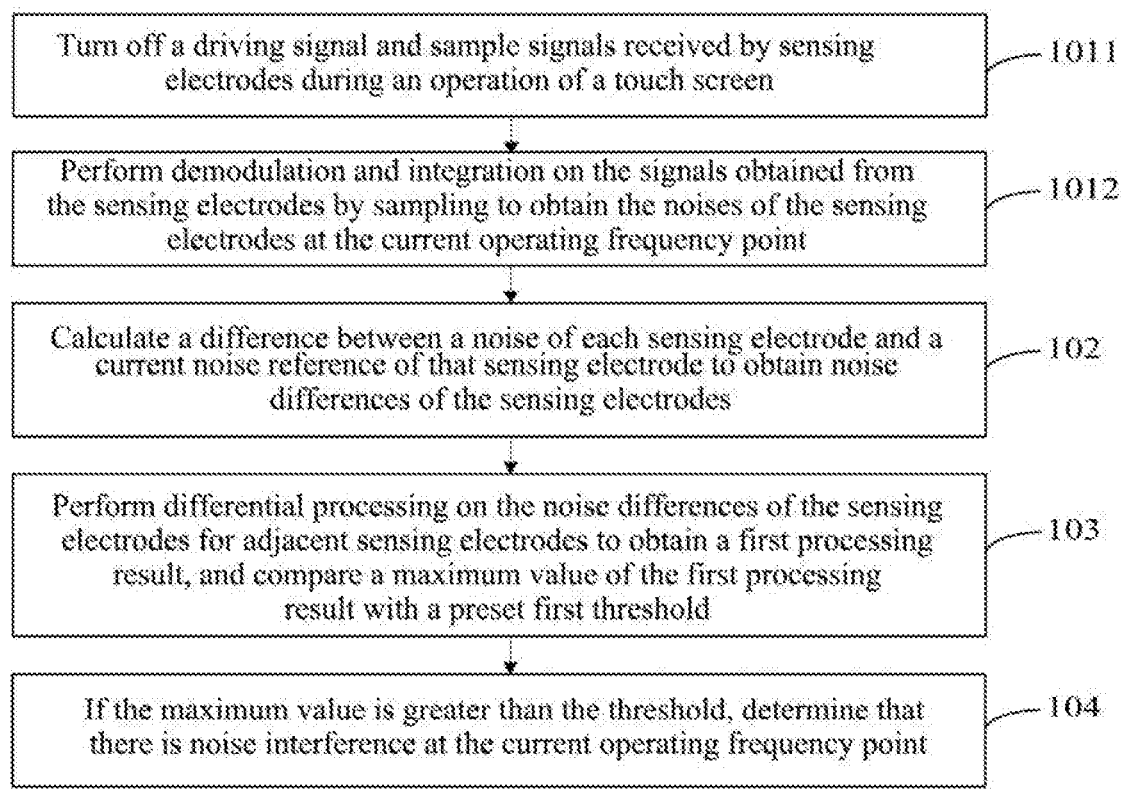

Specifically, the noises of the sensing electrodes can be obtained through various ways, and the methods for obtaining noises in different implementation scenarios may be the same or different. As an implementation for obtaining the noises of the sensing electrodes, as shown in FIG. 2B, based on any embodiment, the obtaining the noises of the sensing electrodes of the touch screen at the current operating frequency point, may specifically include:

1011: turn off a driving signal, and sample signals received by the sensing electrodes; and 1012: perform demodulation and integration on the signals obtained from the sensing electrodes by sampling to obtain the noises of the sensing electrodes at the current operating frequency point.

Specifically, when it is necessary to obtain the noises of the sensing electrodes, the driving signal input to the driving electrodes is first turned off, the signals received by the sensing electrodes are then sampled at sensing electrode ends, and the signals obtained by sampling are demodulated and integrated subsequently to obtain the noises of the sensing electrodes. In practical applications, the touch screen usually has a plurality of driving electrodes and sensing electrodes, which can be arranged in a matrix array. Taking a case where the touch screen is arranged with M column of sensing electrodes thereon as an example, by using the present embodiment, M noise data can be obtained each time.

In practical applications, the driving electrodes can be grounded to turn off the driving signal, that is, in this embodiment, the noises of the sensing electrodes are obtained according to the signals collected from the sensing electrodes in a state where the driving electrodes do not receive the driving signal. In this embodiment, according to the sensing electrode signals collected in the state where the driving signal is turned off, the noises of the sensing electrodes are obtained, and a same-frequency interference noise can be identified, thereby improving the accuracy of subsequent noise detection. It should be noted that the method for obtaining the noises of the sensing electrodes provided by the embodiment may be applied to various implementation scenarios. For example, when determining the initial noise references, the method of the present embodiment can be used to obtain the noises of the sensing electrodes, and when the touch screen is operating normally, the method of the present embodiment can also be used to obtain the noises of the sensing electrodes.

In this embodiment, by collecting the signals received by the sensing electrodes in the state where the driving signal is turned off, and performing demodulation and integration on the signals to obtain the noises of the sensing electrodes, the same-frequency interference noise can be accurately obtained, thereby further improving the accuracy of subsequent noise detection.

As described above, in the process of obtaining the noises of the sensing electrodes, it is needed to perform demodulation and integration on the signals collected from the sensing electrodes. There may be various demodulation and integration processing methods used, for example, demodulation based on a single demodulation signal, or IQ demodulation based on IQ component modulation signals, etc., which is not limited in this embodiment.

After obtaining the noises of each sensing electrodes through the above process, the noise differences of the sensing electrodes are obtained by performing a difference calculation according to the current noise references corresponding to the sensing electrodes, respectively. Further, it is needed to perform differential processing on the noise differences of the sensing electrodes for adjacent sensing electrodes for, so as to eliminate the influence caused due to the direct current component generated during the demodulation process while preserving the effect of the common mode noise, and improve the accuracy of noise detection.

Specifically, as an alternative embodiment, based on any of the embodiments, the performing differential processing on the noise differences of the sensing electrodes for adjacent sensing electrodes to obtain the first processing result in 103 may specifically include:

calculate, for each sensing electrode, a difference between noise differences of that sensing electrode and an adjacent sensing electrode to obtain the first processing result, where the adjacent sensing electrode is located on a fixed side of that sensing electrode.

Take an actual scenario as an example: in the process of inputting the driving signal into the touch screen, the noises of sensing electrodes are obtained, and the difference between a noise of each sensing electrode and a corresponding noise reference is calculated to obtain the noise differences of the sensing electrodes. Then, for each sensing electrode, a difference between a noise difference of that sensing electrode and a noise difference of a sensing electrode adjacent to that sensing electrode is calculated, and a processing result of the adjacent differential processing is obtained. Specifically, adjacent here refers to adjacent to the same side. For example, it is assumed that the adjacent is adjacent to the left side, for each sensing electrode, when adjacent differential processing is performed on its noise difference, a noise difference of an adjacent sensing electrode on the left side is selected for the difference.

For example, it is assumed that there are currently M sensing electrodes $A_1, A_2, \ldots A_M$, and the noise differences obtained for the M sensing electrodes are $Diff_1$, $Diff_2$, ... $Diff_M$, correspondingly, the adjacent differential processing is performed on the noise differences of the M sensing electrodes, the processing result is obtained as $Diff_1$-$Diff_2$, $Diff_2$-$Diff_3$, ... $Diff_{M-1}$-$Diff_M$. Specifically, for a sensing electrode without an adjacent sensing electrode, the above difference calculation is not performed. For this example, the difference calculation is not performed on the sensing electrode $A_M$, that is, the processing result includes M−1 values.

In this embodiment, by performing differential processing on the noise differences of the sensing electrodes for the adjacent sensing electrodes, the influence of the direct current component can be eliminated while preserving the effect of the common mode noise, and the accuracy of the noise detection can be improved.

In general, the solution, by obtaining the noises of the sensing electrodes during normal operation of the touch screen, obtaining the noise differences of the sensing electrodes with reference to the noise references of the sensing electrodes, and performing differential processing on the noise differences of the sensing electrodes for the adjacent sensing electrodes, eliminates the influence of the direct current component. Subsequently, the maximum value is selected from the processing result of the differential processing for comparing with the preset threshold, if the maximum value is greater than the threshold, it indicates that noise interference exists currently. This solution introduces a concept of noise reference, and then performs noise calculation based on the differences between the obtained noises and the noise references, which can eliminate the influence caused by the differences between the sensing electrodes, and can more accurately reflect the actual noise.

Then, noise reduction processing is performed based on the noise detection result. Specifically, there are various methods for reducing noise. For example, linear filtering or nonlinear filtering processing may be performed. For another example, a secondary processing is performed on signals by software algorithms. In addition, it is also possible to adjust a frequency of the driving signal based on a signal-to-noise ratio in a linear filtering process with low noise.

Figure 2C:
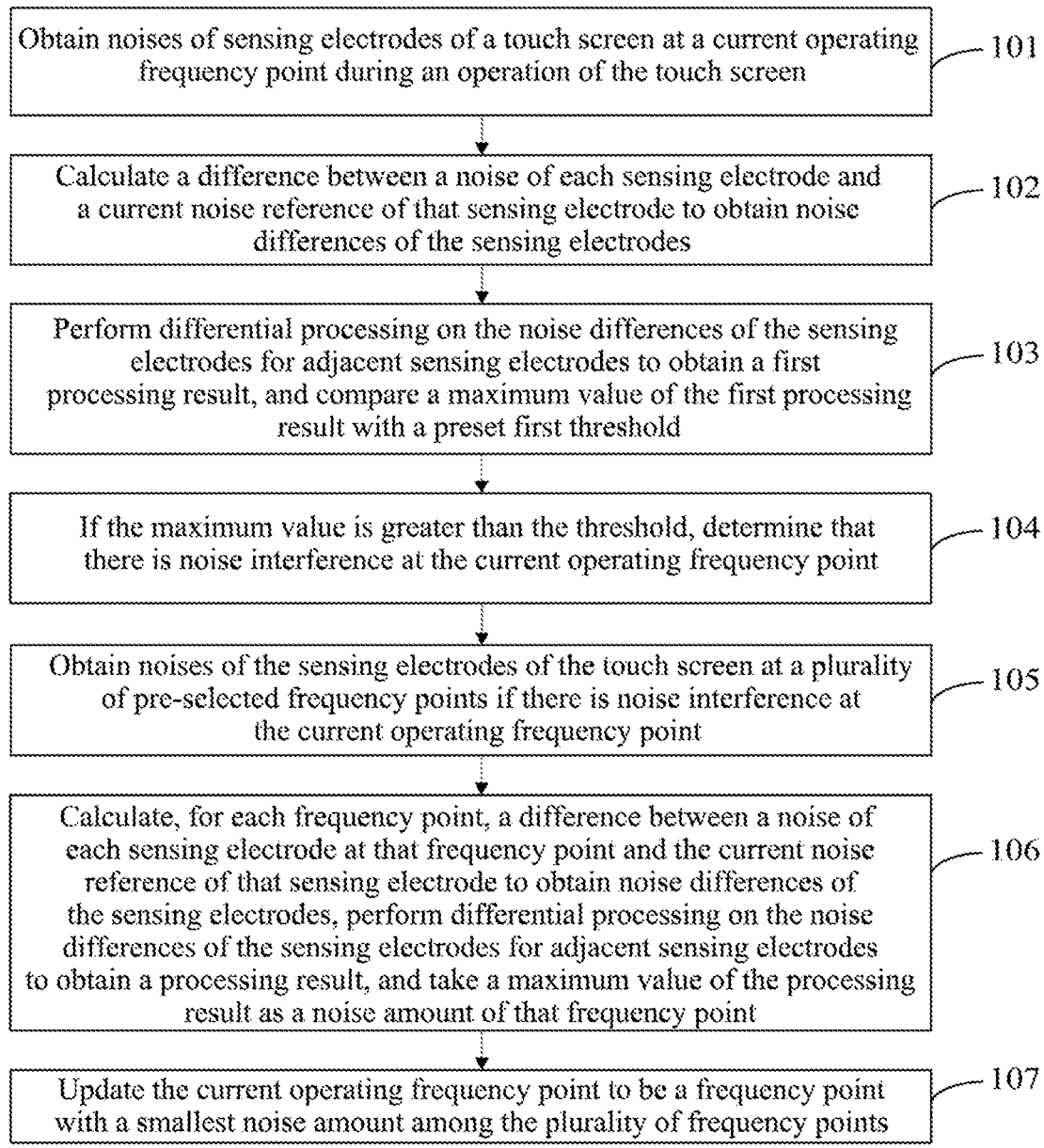

Preferably, the schema achieves noise processing by using a frequency modulation scheme. Specifically, as shown in FIG. 2C, on the basis of the first embodiment, the method may further include:

105: obtain noises of the sensing electrodes of the touch screen at a plurality of pre-selected frequency points if there is noise interference at the current operating frequency point;

106: calculate, for each frequency point, a difference between a noise of each sensing electrode at that frequency point and the current noise reference of that sensing electrode to obtain noise differences of the sensing electrodes, and perform differential processing on the noise differences of the sensing electrodes for adjacent sensing electrodes to obtain a processing result, and take a maximum value of the processing result as a noise amount of that frequency point; and 107: update the current operating frequency point to be a frequency point with a smallest noise amount among the plurality of frequency points.

Specifically, a plurality of frequencies are pre-selected as pre-selected operating frequency points. During the normal operation of the touch screen, noise interference at the current frequency point is detected based on the noise detecting method provided by the solution. If it is determined that there is noise interference at the current frequency point, all pre-selected frequency points are traversed to obtain the current noise at all pre-selected frequency points, and then a frequency point with the least noise is selected as the current operating frequency point, that is, the current operating frequency point is switched to the frequency point with the lowest noise currently to achieve noise processing.

In this embodiment, when it is detected that there is noise interference at the current operating frequency point, the noises at the pre-selected frequency points are traversed, and the frequency point with the least noise is selected as the current operating frequency point, which realizes the processing of the noise interference, and effectively reduces the noise interference.

The noise detecting method provided by this embodiment, obtains the noises of the sensing electrodes of the touch screen at the current frequency point during inputting a drive signal to the touch screen, obtains the noise differences of the sensing electrodes by calculating the differences between the noises of the sensing electrodes and the corresponding noise references, and further performs adjacent differential processing on the noise differences of the sensing electrodes to obtain the processing result, and thus determines whether there is noise interference currently according to whether the maximum value of the processing result exceeds the preset threshold. In the process of identifying noise interference, the solution can eliminate an influence of signal difference between the sensing electrodes by introducing the noise references, thereby more accurately reflecting actual noise. Moreover, the solution can eliminate an influence of a direct current component in a demodulation process by performing the adjacent differential calculation on the noise differences, thereby improving an accuracy of the noise detection.

Figure 3A:
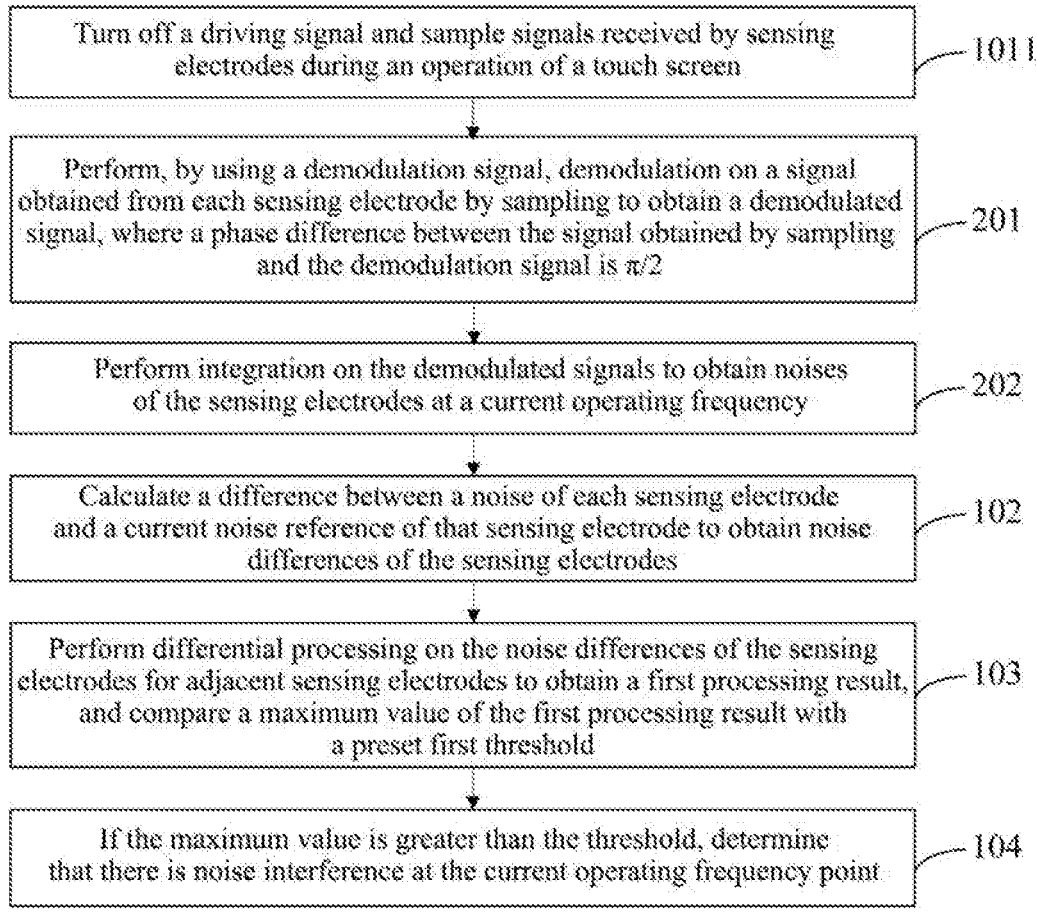
FIGS. 3A-3B are schematic flowcharts of a noise detecting method according to a second embodiment of the present application.

Specifically, as described in the first embodiment, the noises of the sensing electrodes can be obtained based on different demodulation methods. As an implementable manner, FIG. 3A is a schematic flowchart of a noise detecting method according to a second embodiment of the present application. On the basis of the first embodiment, when obtaining the noises of the sensing electrodes, the second embodiment performs the demodulation by using a single demodulation signal. As shown in FIG. 3A, based on the first embodiment, 1012 may specifically include:

201: perform, by using a demodulation signal, demodulation on a signal obtained from each sensing electrode by sampling, to obtain a demodulated signal, where a phase difference between the signal obtained by sampling and the demodulation signal is $\pi/2$; and 202: perform integration on the demodulated signals to obtain the noises of the sensing electrodes at the current operating frequency.

Figure 3B:
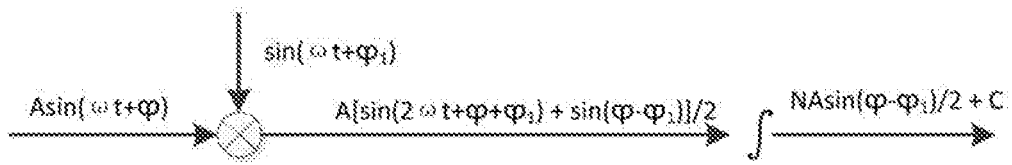

Take an actual scenario as an example: as shown in FIG. 3B, the drawing is a schematic flowchart of performing demodulation and integration processing on the signals obtained by sampling in the second embodiment. As shown in the drawing, it is assumed that an ideal signal received by a sensing electrode, which is obtained by sampling, is $A\sin(\omega_t+\phi)$, and the signal is demodulated and integrated in turn, where a frequency of the signal coupled to the sensing electrode is $\omega$, a phase of the signal coupled to the sensing electrode is $\phi$, and a phase amplitude of the signal coupled to the sensing electrode is A. Specifically, a frequency of the demodulation signal, which is the same as the frequency of the signal obtained by sampling, is $\omega$, and a phase of the demodulation signal is $\phi_1$, and the decoded and integrated signal is $NA\sin(\phi-\phi_1)/2+C$, where C is a direct current component of an integrator, and N is an integration time. In this embodiment, the phase of the demodulation signal is preferably set to be different from the phase of the sampled signal by $\pi/2$, that is, $\phi-\phi_1=\pi/2$, which will result in a better signal demodulation result.

In practical applications, if there is a same-frequency noise signal (i.e., whose frequency is also ω with an amplitude B and a phase β, then the resulted signal obtained after the above demodulation and integration processing is NA $\sin(\phi-\phi_1)/2+C+NB \sin(\beta-\phi_1)/2$. It can be seen that a part into which a noise is introduced is reflected in the demodulation result and is concomitantly reflected in a subsequent noise detection process, and the noise signal is subsequently detected by the noise detection solution. In specific practical applications, the noise is usually unstable, and the phase and amplitude will change randomly, thus reducing the signal-to-noise ratio. However, by introducing the noise references and adjacent differential processing, the solution can preserve the noise signal, eliminate the influence of the direct current component, and improve the accuracy of the noise detection.

Specifically, after obtaining the noises of the sensing electrodes based on the solution of this embodiment, the noise differences of the sensing electrode are calculated according to the noises and noise references, the differential processing is further performed on the adjacent sensing electrodes, and a maximum value is selected from the processing result for comparing with the preset threshold to accurately determine the currently existing noise interference.

The noise detecting method in the embodiment, by collecting the signals of the sensing electrodes when the touch screen is operating normally, and performing demodulation on the signals using a demodulation signal with a phase difference of $\pi/2$ with respect to the signals, can optimize the demodulation result, and by subsequently performing integration on the demodulated signals to obtain the noises of the sensing electrodes and performing noise detection, can further improve the accuracy of noise detection.

Figure 4A:
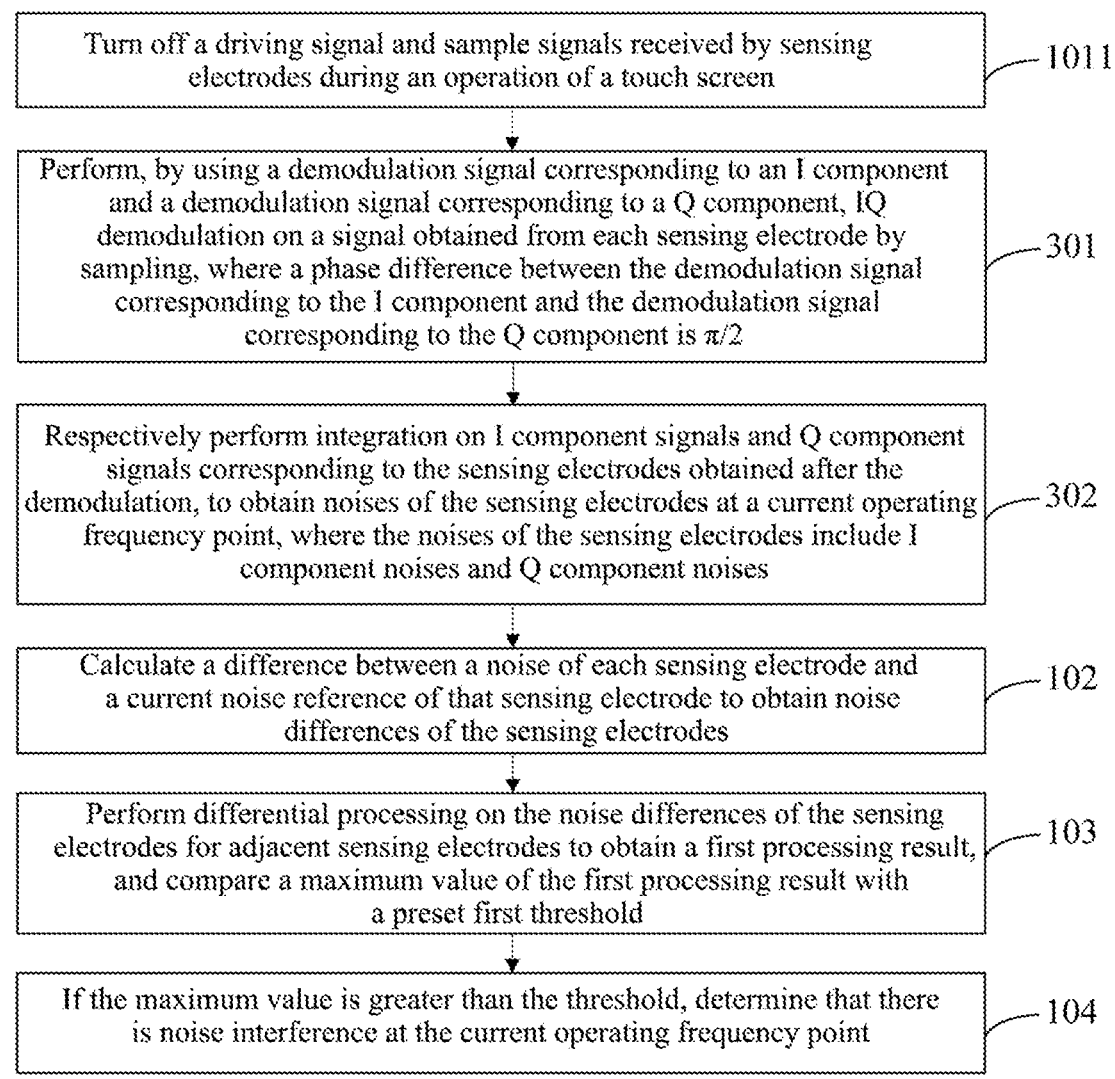
FIGS. 4A-4B are schematic flowcharts of a noise detecting method according to a third embodiment of the present application.

As another implementable manner, FIG. 4A is a schematic flowchart of a noise detecting method according to a third embodiment of the present application. On the basis of the first embodiment, when the noises of the sensing electrodes are obtained, the third embodiment uses IQ demodulation signals for demodulation. As shown in FIG. 4A, based on the first embodiment, 1012 may specifically include:

301: perform, by using a demodulation signal corresponding to an I component and a demodulation signal corresponding to a Q component, IQ demodulation on a signal obtained from each sensing electrode by sampling, where a phase difference between the demodulation signal corresponding to the I component and the demodulation signal corresponding to the Q component is $\pi/2$;

302: respectively perform integration on I component signals and Q component signals corresponding to the sensing electrodes obtained after the demodulation, to obtain the noises of the sensing electrodes at a current operating frequency point, where the noises of the sensing electrodes include I component noises and Q component noises.

Figure 4B:
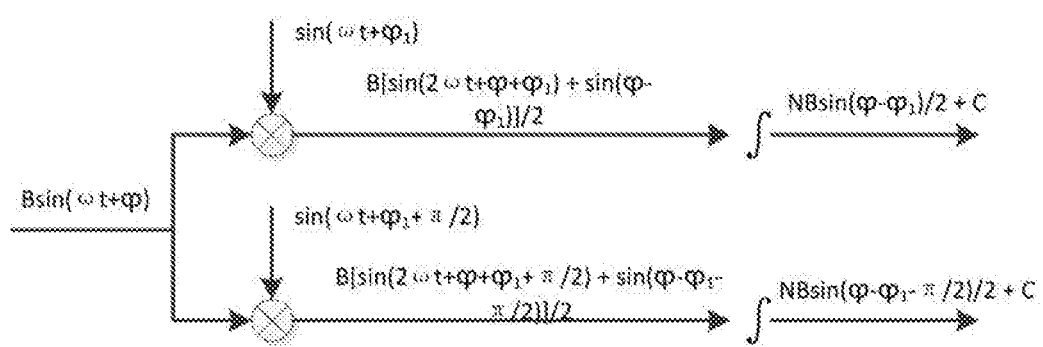

Take an actual scenario as an example: as shown in FIG. 4B, the drawing is a schematic flowchart of performing IQ demodulation and integration processing on the signals obtained by sampling in the third embodiment. As shown in the drawing, it is assumed that an ideal signal received by a sensing electrode, which is obtained by sampling, is B $\sin(\Omega_t+\phi)$, and the signal is demodulated and integrated in turn, where a frequency of the signal coupled to the sensing electrode is Ω, a phase of the signal coupled to the sensing electrode is $\phi$, and a phase amplitude of the signal coupled to the sensing electrode is B. Specifically, a frequency of the demodulation signals corresponding to the I component and the Q component is also Ω, and a phase difference between the two components is $\pi/2$, and the demodulated and integrated signal includes the I component signal and the Q component signal as shown in the drawing, where C is the direct current component of integrators, and N is integration time. In this embodiment, the phases of the demodulation signal corresponding to the I component and the Q component are preferably set to be different by $\pi/2$ to obtain a better signal demodulation result. It can be understood that, the solution, by introducing the noise references, and calculating a different between the noises with the noise references, can preserve the noise signal, and eliminate the influence of the direct current component, thereby improving the accuracy of the noise detection.

Specifically, the noises of the sensing electrodes obtained according to the solution of this embodiment include I component noises and Q component noises, and correspondingly, the noise references determined based on the noises of the sensing electrodes also include I component references and Q component references. Correspondingly, the specific process of calculating the noise differences is to obtain differences between the I component noises and the I component references and differences between the Q component noises and the Q component references respectively, and obtain noise differences of the sensing electrodes, where the noise differences include I component noise differences and Q component noise differences. Correspondingly, based on the third embodiment, 102 may specifically include:

calculate a difference between an I component noise of each sensing electrode and an I component reference of the current noise reference of that sensing electrode to obtain I component noise differences of the sensing electrodes; and calculate a difference between an Q component noise of each sensing electrode and an Q component reference of the current noise reference of that sensing electrode to obtain Q component noise differences of the sensing electrodes.

Further, when the differential processing for the adjacent sensing electrodes is performed on the noise differences, the I component noise differences of the sensing electrodes and the Q component noise differences of the sensing electrode need to be respectively adjacent differentiated. Correspondingly, based on the third embodiment, the performing differential processing on the noise differences of the sensing electrodes for adjacent sensing electrodes to obtain the first processing result in 103 may specifically include:

calculate, for each sensing electrode, a difference between I component noise differences of that sensing electrode and an adjacent sensing electrode and a difference between Q component noise differences of that sensing electrode and the adjacent sensing electrode, respectively, to obtain a differential result of that sensing electrode, the differential result includes an I component result and a Q component result, where the adjacent sensing electrode is located on a fixed side of that sensing electrode;

perform, for each sensing electrode, a square root calculation on a squared sum of the I component result and the Q component result of that sensing electrode, to obtain the first processing result.

Specifically, according to the I component noise differences and the Q component noise differences of the sensing electrodes, differential processing on the I component noise differences of adjacent sensing electrodes and the Q component noise differences of the adjacent sensing electrodes are respectively performed to obtain differential results including an I component result and a Q component result. Subsequently, a square sum calculation is performed on the I component result and the Q component result, that is, a sum of a square of a I component result and a square of a Q component result is obtained, and then a square root calculation is performed on the obtained sum to obtain the final processing result, i.e. a modulus value result. Then, a maximum value is selected from the processing results for comparing with the preset threshold to detect the currently existing noise.

The noise detecting method provided in this embodiment, by collecting the signals of the sensing electrodes when the touch screen operates normally and performing IQ demodulation and integration on the signals, can optimize the demodulation result; and by calculating the noise differences and performing the adjacent differential processing after obtaining the noise including two components, obtaining the modulus value results finally and measuring the noise according to the modulus value results rather than single component signals, can reflect the magnitude of the common mode noise more accurately, reduce the influence caused by frequent variation in the phase of common mode noise, thereby further improving the accuracy of noise detection.

In addition, in practical applications, an initial noise reference containing noise (for example, noise when power is powered on) or environmental variation, which may lead to that the current noise reference is no longer applicable. For example, if a noise reference contains common mode noise, and a subsequent period may be in a normal environment without common mode noise, then the noise calculated based on the original noise references will have a large error, which thus affects the accuracy of subsequent noise detection result. Therefore, it is needed to update and maintain the noise references to ensure the stability and reliability of noise detection.

Figure 5:
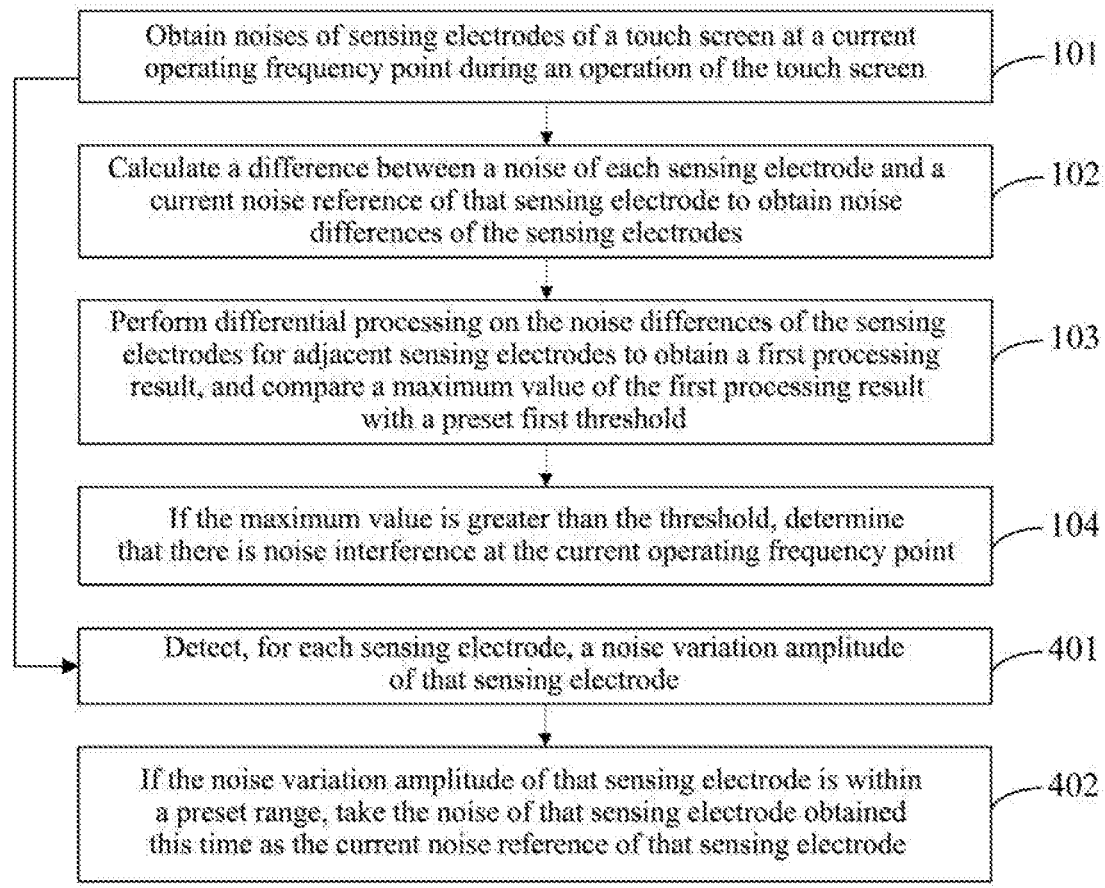
FIG. 5 is a schematic flowchart of a noise detecting method according to a fourth embodiment of the present application.

In an embodiment, this solution determines whether it is necessary to update the noise references based on the "stationarity" of the noises. As an example, FIG. 5 is a schematic flowchart of a noise detecting method according to a fourth embodiment of the present application. On the basis of any of the foregoing embodiments, the fourth embodiment updates and maintains the noise. As shown in FIG. 5, based on any of the foregoing embodiments, after 101, the method may further include:

401: detect, for each sensing electrode, a noise variation amplitude of that sensing electrode;

402: if the noise variation amplitude of that sensing electrode is within a preset range, take the noise of that sensing electrode obtained this time as the current noise reference of that sensing electrode.

Specifically, if the noise variation amplitude of the sensing electrode is small, that is, the noise is relatively stable, the noise reference can be updated, conversely, if the noise variation amplitude of the sensing electrode is large, it indicates that the current noise signal is unstable, and the noise reference is not updated to ensure the stability of the noise detection. The specific update strategy is to update the current noise reference according to newly obtained noises of the sensing electrodes.

In an embodiment, there are many ways to detect the noise variation amplitude. For example, this embodiment detects whether the noise is stable by analyzing a plurality of consecutive noise data. Specifically, on the basis of the fourth embodiment, 401 may specifically include:

calculate, for each sensing electrode, a difference between noises of that sensing electrode obtained this time and the last time to obtain noise variations of the sensing electrodes;

perform differential processing on the noise variations of the sensing electrodes for adjacent sensing electrodes to obtain a second processing result, and take a maximum value of the second processing result as a noise variation result obtained this time;

return to perform the step of obtaining the noises of the sensing electrodes of the touch screen at the current operating frequency point during inputting the driving signal into the touch screen, until it is detected that noise variation result obtained is less than a preset second threshold for continuous M times, determine that the noise variation amplitude of that sensing electrode is within a preset range, where M is a preset positive integer.

Specifically, during the normal operation of the touch screen, after obtaining the noises of the sensing electrodes, in addition to the noise detection based on the foregoing solution, the noise variations are obtained according to the noises obtained this time and last time, and differential processing is performed on the noise variations of the sensing electrodes for adjacent sensing electrodes. The process of performing the adjacent differential processing is similar to the process of performing the adjacent differential processing described above, the only difference lies in the processed objects, and thus, reference may be made to related content in the foregoing embodiments, and details are not described herein again. After the adjacent differential is performed on the noise variations of the sensing electrodes, the second processing result is obtained, and a maximum value is selected from the second processing result as the noise variation result obtained this time. Subsequently, the above process is circularly performed for multiple times. If it is detected that the noise variation result obtained is less than a certain threshold for continuous M times, it indicates that the current noise is relatively stable, and the current noise reference can be updated. If a number for which the noise variation result is continuously less than the certain threshold does not reach the preset M times, and a certain noise variation result obtained exceeds the threshold, then the noise reference is not updated, and the previous count of noise variation result less than the threshold value is cleared, the number of the noise variation results being continuously less than the certain threshold is recounted.

The noise detecting method provided by this embodiment, by detecting the current amplitudes of the noises according to the obtained noises of the sensing electrodes, and if the noise is relatively stable, updating the noise references according to the obtained noises of the sensing electrodes, implements the update and maintenance of the noise references, and avoids false detection of noise caused by inaccurate noise references, thereby ensuring stability and reliability of noise detection.

As an example, a fifth embodiment of the present application provides a noise detecting method, the process of this embodiment mainly includes obtaining noises, detecting noises with reference to noise references, noise reference maintenance, and the like. Specific steps are as follows:

1. After the touch screen is powered on, ground the drive electrode first, perform IQ demodulation and integration on signals of the sensing electrodes obtained by sampling, to obtain the noises $Ref\_I_1$, $Ref\_I_2$ . . . $Ref\_I_m$; $Ref\_Q_1$, $Ref\_Q_2$ . . . $Ref\_Q_m$ of the sensing electrodes as initial noise references $Ref\_I$ and $Ref\_Q$ for the sensing electrodes, where m is the number of the sensing electrodes.

Taking 8 sensing electrodes as an example, as shown in FIG. 6A, which is a noise reference diagram of the sensing electrodes, subsequently, a driving signal is input into the driving electrodes, during which the noises of the sensing electrodes are obtained. As shown in FIG. 6B, which is a schematic diagram of the noises of the sensing electrodes, the noises of the sensing electrode in the drawing are $Raw\_I_1$, $Raw\_I_2$ ... $Raw\_I_m$; $Raw\_Q_1$, $Raw\_Q_2$ ... $Raw\_Q_m$, that is, the noise Raw includes Raw_I and Raw_Q.

2. Calculate the noise differences of the sensing electrodes. The specific method is as follows: (still taking 8 columns of sensing electrodes as an example, where k is 1~7):

1) Subtract the noise reference Ref_I from the obtained noise Raw_I to obtain the noise differences Diff_I, Diff_Q of the sensing electrodes:

$$Diff\_I = Raw\_I - Ref\_I$$

$$Diff\_Q = Raw\_Q - Ref\_Q$$

2) Perform adjacent differential processing on Diff_I and Diff_Q respectively to eliminate the influence of the direct current component and preserve common mode noise:

$$Diff2\_I_k = Diff\_I_k - Diff\_I_{k+1}$$

$$Diff2\_Q_k = Diff2\_Q_k - Diff2\_Q_{k+1}$$

3) Perform a square root calculation on a squared sum of the obtained $Diff2\_I_k$ and $Diff2\_Q_k$, to obtain modulus value noises of the sensing electrodes:

$$Noise_k = \sqrt{Diff2\_I_k^2 + Diff2\_Q_k^2}$$

4) Take a maximum value Noise in the modulus value noises, compare Noise with a preset first threshold, and determine whether there is noise interference currently:

$$Noise = \max\{Noise_1 \ldots Noise_k\}$$

3. Design an update and maintenance mechanism for noise references, the specific method is as follows:

1) Calculate a difference between a current noise Raw and a last obtained noise $Raw_{old}$, to obtain noise variations $Raw_\Delta$ of the sensing electrodes.

2) Perform adjacent differential on the noise variations $Raw_\Delta$ of the sensing electrodes to obtain $Raw_{\Delta diff}$.

3) Calculate modulus value noises M of the sensing electrodes according to the $Raw_{\Delta diff}$ corresponding to I components and Q components, and take the maximum M as a noise variation result $Noise_\Delta$.

4) if $Noise_\Delta$ is less than the preset second threshold for continuous M times, which indicates that a current noise variation is small, then take the current noise Raw as the current noise reference.

4. Based on the above steps, the noise at the current frequency point can be obtained, and the operating frequency points are selected as follows:

1) If there is no noise interference at the current operating frequency point, that is, the maximum value of the first processing result is not greater than the preset first threshold, then continue the noise detection, otherwise obtain the noise of a plurality of pre-selected frequency points.

2) Select a frequency point with a smallest noise from the plurality of pre-selected frequency points as the current operating frequency point, and continue the noise detection after switch the operating frequency point.

The noise detecting method provided by this embodiment, obtains the noises of the sensing electrodes of the touch screen at the current frequency point during the driving signal is input into the touch screen, obtains the noise differences of the sensing electrodes by calculating the differences between the noises of the sensing electrodes and the corresponding noise references, and further performs adjacent differential processing on the noise differences of the sensing electrodes to obtain the processing result, and then determines whether there is noise interference currently according to whether the maximum value of the processing result exceeds the preset threshold. In the process of identifying noise interference, the solution can eliminate an influence of signal differences between the sensing electrodes by introducing the noise references, thereby reflecting actual noise more accurately. Moreover, the solution can eliminate an influence of a direct current component in a demodulation process by performing the adjacent differential calculation on the noise differences, thereby improving an accuracy of the noise detection.

Figure 7:
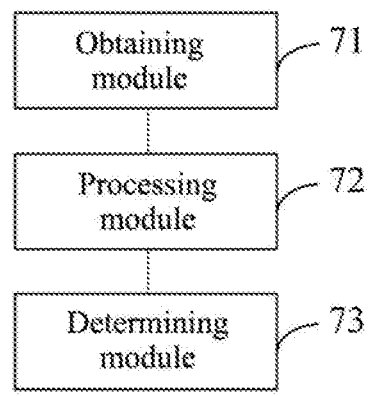
FIG. 7 is a schematic structural diagram of a noise detecting apparatus according to a sixth embodiment of the present application.

FIG. 7 is a schematic structural diagram of a noise detecting apparatus according to a sixth embodiment of the present application, the noise detecting apparatus is used to accurately identify a current noise. Referring to FIG. 7, the noise detecting apparatus includes:

an obtaining module 71, configured to obtain noises of sensing electrodes of a touch screen at a current operating frequency point during an operation of the touch screen;

a processing module 72, configured to calculate a difference between a noise of each sensing electrode and a current noise reference of that sensing electrode, to obtain noise differences of the sensing electrodes;

where the processing module 72 is further configured to perform differential processing on the noise differences of the sensing electrodes for adjacent sensing electrodes to obtain a first processing result, and compare a maximum value of the first processing result with a preset first threshold; and a determining module 73, configured to determine that there is noise interference at the current operating frequency point if the maximum value is greater than the threshold.

In practical applications, the noise detecting apparatus can be implemented by software codes, the noise detecting apparatus may also be a medium stored with an associated execution code, for example, a USB flash drive or the like. Alternatively, the noise detecting apparatus may also be a physical device integrated or installed with relevant execution codes, for example, chips, smart terminals, computers, and various electronic devices.

In this solution, there are various implementation scenarios for the obtaining module 71 to obtain the noises of the sensing electrodes. One scenario is an initial scenario, where the obtaining module 71 obtains noises of the sensing electrodes in an initial state, and the noises will be used as the initial noise references. Another scenario is during a normal operation of the touch screen, where the obtaining module 71 obtains the noises of the sensing electrodes, and subsequently implements noise detection.

Correspondingly, in order to determine the initial noise references, on the basis of the sixth embodiment, the obtaining module 71 is further configured to obtain noises of the sensing electrodes of the touch screen at the current operating frequency point before the touch screen is driven for the first time, which are taken as the current noise references of the sensing electrodes. According to this embodiment, the initial noise references are determined, and then accurate noise detection is achieved subsequently based on the noises of the sensing electrodes obtained in the process of inputting a driving signal and the noise references.

As an implementation of obtaining the noises of the sensing electrodes, on the basis of any embodiment, the obtaining module 71 may include: a sampling unit, specifically configured to turn off the driving signal, and sample signals received by the sensing electrodes; a processing unit, configured to perform demodulation and integration on the signals obtained from the sensing electrodes by sampling to obtain the noises of the sensing electrodes at the current operating frequency point. Specifically, when it is necessary to obtain the noises of the sensing electrodes, the sampling unit first turns off the driving signal input to the driving electrodes, and then samples the signals received by the sensing electrodes at sensing electrode ends, and subsequently, the processing unit demodulates and integrates the signals obtained by sampling to obtain the noises of the sensing electrodes. It should be noted that the method for obtaining the noises of the sensing electrodes provided by the embodiment may be applied to various implementation scenarios. In this embodiment, by collecting the signals received by the sensing electrodes in the state where the driving signal is turned off, and performing demodulation and integration on the signals to obtain the noises of the sensing electrodes, the same-frequency interference noise can be accurately obtained, thereby further improving the accuracy of subsequent noise detection.

As described above, in the process of obtaining the noises of the sensing electrodes, it is needed to perform demodulation and integration on the signals collected from the sensing electrodes. There may be various demodulation and integration processing methods used, which is not limited in this embodiment.

Specifically, as an alternative embodiment, based on any of the embodiments, the processing module 72 is specifically configured to, calculate, for each sensing electrode, a difference between noise differences of that sensing electrode and an adjacent sensing electrode to obtain the first processing result, where the adjacent sensing electrode is located on a fixed side of that sensing electrode. In this embodiment, by performing differential processing on the noise differences of the sensing electrodes for the adjacent sensing electrodes, the influence of the direct current component can be eliminated while preserving the effect of the common mode noise, and the accuracy of the noise detection can be improved.

Then, noise reduction processing may be performed based on the noise detection result. Preferably, based on the sixth embodiment, the obtaining module 71 is further configured to obtain noises of the sensing electrodes of the touch screen at a plurality of pre-selected frequency points if there is noise interference at the current operating frequency point; and the processing module 72 is further configured to, calculate, for each frequency point, a difference between a noise of each sensing electrode at that frequency point and the current noise reference of that sensing electrode to obtain noise differences of the sensing electrodes, and perform differential processing on the noise differences of the sensing electrodes for adjacent sensing electrodes to obtain a processing result, and take a maximum value of the processing result as a noise amount of that frequency point. The apparatus further includes: an optimization module, configured to update the current operating frequency point to be a frequency point with a smallest noise amount among the plurality of frequency points. In this embodiment, when it is detected that there is noise interference at the current operating frequency point, the noises at the pre-selected frequency points are traversed, and the frequency point with the least noise is selected as the current operating frequency point, which realizes the processing of the noise interference, and effectively reduces the noise interference.

The noise detecting apparatus provided by this embodiment, obtains the noises of the sensing electrodes of the touch screen at the current frequency point during inputting a drive signal to the touch screen, obtains the noise differences of the sensing electrodes by calculating the differences between the noises of the sensing electrodes and the corresponding noise references, and further performs adjacent differential processing on the sensing electrodes to obtain the processing result, and thus determines whether there is noise interference currently according to whether the maximum value of the processing result exceeds the preset threshold. In the process of identifying noise interference, the solution can eliminate an influence of signal difference between the sensing electrodes by introducing the noise references, thereby more accurately reflecting actual noise. Moreover, the solution can eliminate an influence of a direct current component in a demodulation process by performing the adjacent differential calculation on the noise differences, thereby improving an accuracy of the noise detection.

As an implementable manner, a seventh embodiment of the present application provides a noise detecting apparatus, and based on the sixth embodiment, the processing unit includes:

a first demodulating subunit, configured to perform, by using a demodulation signal, demodulation on a signal obtained from each sensing electrode by sampling to obtain a demodulated signal, where a phase difference between the signal obtained by sampling and the demodulation signal is $\pi/2$;

a first integrating subunit, configured to perform integration on the demodulated signals to obtain the noises of the sensing electrodes at the current operating frequency.

The noise detecting apparatus in the embodiment, by collecting the signals of the sensing electrodes when the touch screen is operating normally, and performing demodulation on the signals using a demodulation signal with a phase difference of $\pi/2$ with respect to the signals, can optimize the demodulation result, and by subsequently performing integration on the demodulated signals to obtain the noises of the sensing electrodes and performing noise detection, can further improve the accuracy of noise detection.

As an implementable manner, an eighth embodiment of the present application provides a noise detecting apparatus, and based on the sixth embodiment, the processing unit includes:

a second demodulating subunit, configured to perform, by using a demodulation signal corresponding to an I component and a demodulation signal corresponding to a Q component, IQ demodulation on a signal obtained from each sensing electrode by sampling, where a phase difference between the demodulation signal corresponding to the I component and the demodulation signal corresponding to the Q component is $\pi/2$;

a second integrating subunit, configured to respectively perform integration on I component signals and Q component signals corresponding to the sensing electrodes obtained after the demodulation to obtain the noises of the sensing electrodes at the current operating frequency point, where the noises of the sensing electrodes include I component noises and Q component noises.

Specifically, the noises of the sensing electrodes obtained according to the solution of this embodiment include I component noises and Q component noises, and correspondingly, based on the eighth embodiment, the processing module includes:

a first calculating unit, configured to calculate a difference between an I component noise of each sensing electrode and an I component reference of the current noise reference of that sensing electrode to obtain I component noise differences of the sensing electrodes;

where the first calculating unit is further configured to calculate a difference between an Q component noise of each sensing electrode and an Q component reference of the current noise reference of that sensing electrode to obtain Q component noise differences of the sensing electrodes;

a first differential unit, configured to calculate, for each sensing electrode, a difference between I component noise differences of that sensing electrode and an adjacent sensing electrode and a difference between Q component noise differences of that sensing electrode and an adjacent sensing electrode respectively to obtain a differential result of that sensing electrode, the differential result includes an I component result and a Q component result, where the adjacent sensing electrode is located on a fixed side of that sensing electrode; and where the first calculating unit is further configured to perform, for each sensing electrode, a square root calculation on a squared sum of an I component result and a Q component result of that sensing electrode to obtain the first processing result.

The noise detecting apparatus provided in this embodiment, by collecting the signals of the sensing electrodes when the touch screen operates normally and performing IQ demodulation and integration on the signals, can optimize the demodulation result, and by calculating the noise differences and performing the adjacent differential processing after obtaining the noise including two components, obtaining the modulus value results finally, and measuring the noise according to the modulus value results rather than single component signals, can reflect the magnitude of the common mode noise more accurately, and reduce the influence caused by frequent variation in the phase of common mode noise, thereby further improving the accuracy of noise detection.

In an embodiment, this solution determines whether it is necessary to update the noise references based on the "stationarity" of the noises. As an example, a ninth embodiment of the present application provides a noise detecting apparatus, and based on any of the foregoing embodiments, the apparatus further includes:

a detection module, configured to, after the obtaining module obtains the noises of the sensing electrodes of the touch screen at the current operating frequency point during inputting a driving signal into the touch screen, detect, for each sensing electrode, a noise variation amplitude of that sensing electrode;

an update module, configured to, if the noise variation amplitude of that sensing electrode is within a preset range, take the noise of that sensing electrode obtained this time as the current noise reference of that sensing electrode.

In an embodiment, there are many ways to detect the noise variation amplitude. For example, based on the ninth embodiment, the detection module includes:

a second calculating unit, configured to calculate, for each sensing electrode, a difference between noises of that sensing electrode obtained this time and the last time to obtain noise variations of the sensing electrodes;

a second differential unit, configured to perform differential processing on the noise variations of the sensing electrodes for adjacent sensing electrodes to obtain a second processing result, and take a maximum value of the second processing result as a noise variation result obtained this time; and a detection unit, configured to instruct the obtaining module to perform the step of obtaining the noises of the sensing electrodes of the touch screen at the current operating frequency point during inputting the driving signal into the touch screen, until it is detected that noise variation result obtained is less than a preset second threshold for continuous M times, and determine that the noise variation amplitude of that sensing electrode is within a preset range, where M is a preset positive integer.

The noise detecting apparatus provided by this embodiment, by detecting the current amplitudes of the noises according to the obtained noises of the sensing electrodes and updating the noise references according to the obtained noises of the sensing electrodes if the noise is relatively stable, implements the update and maintenance of the noise references, and avoids false detection of noise caused by inaccurate noise references, thereby ensuring stability and reliability of noise detection.

A tenth embodiment of the present application further provides a computer readable storage medium, the computer readable storage medium may include: various media that can store program codes, such as U disk, mobile hard disk, read-only memory (ROM), random access memory (RAM), disk or optical disk, etc. Specifically, the computer readable storage medium has program instructions stored therein, and the program instructions are used in the noise detecting method in the above embodiments.

An eleventh embodiment of the present application provides an electronic device, the electronic device includes at least one processor and a memory, the memory is configured to store computer-executable instructions, the number of the processor can be one or more, and the processor may work alone or together, the processor is configured to execute the computer-executable instructions stored in the memory, to achieve the noise detecting method in the above embodiments.

The technical solutions and technical features in the above various embodiments may be separate or combined in the case of no conflict, as long as it does not exceed the scope of knowledge of those skilled in the art, it belongs to equivalent embodiments within the scope of protection of the present application.

In the several embodiments provided by the present application, it should be understood that the disclosed related systems, and methods may be implemented in other ways. For example, the system embodiments described above are merely illustrative. For example, the division of the module or unit is only a logical function division, and there may be other division ways in actual implementation, for example, multiple units or components may be combined or be integrated into another system, or some features may be ignored or not executed. In addition, coupling or direct coupling or communication connection shown or discussed herein may be an indirect coupling or communication connection through some interfaces, systems or units, and may be electrical, mechanical or in other forms.

The integrated units may be stored in a computer readable storage medium if implemented in the form of a software functional unit, and sold or used as a standalone product. Based on such understanding, the technical solution of the present application, in essence, or the part contributing to the existing technology or all or the part of the technical solution can be embodied in the form of a software product, which is stored in a storage medium and includes a number of instructions for enabling a computer processor to perform all or part of the steps described in methods in each embodiment of the present application. The above storage medium includes various media that can store program code, such as a U disk, a mobile hard disk, a read-only memory (ROM), a random access memory (RAM), a magnetic disk, or an optical disk.

The above is only the embodiments of the present application, and thus does not limit the scope of the patent of the present application, and the equivalent structure or equivalent process transformation made by using the specification and the drawings of the present application, or directly or indirectly applied to other related technologies field is equally included in the scope of patent protection of this application.

Finally, it should be noted that the above embodiments are only used to explain the technical solutions of the present application, but are not limited thereto. Although the present application has been described in detail with reference to the foregoing embodiments, those skilled in the art should understand that the technical solutions described in the foregoing embodiments may be modified, or some or all of the technical features may be equivalently replaced. However, these modifications or substitutions do not depart the essence of the corresponding technical solution from the scope of the technical solutions of the embodiments of the present application.

What is claimed is:

1. A noise detecting method, comprising:
obtaining a noise of each sensing electrode of a plurality of sensing electrodes of a touch screen at a current operating frequency point during an operation of the touch screen;
calculating, for each sensing electrode respectively, a difference between the noise of the sensing electrode and a current noise reference of the sensing electrode to obtain a noise difference of the sensing electrode;
performing, for each sensing electrode respectively, differential processing on the noise difference of the sensing electrode and a noise difference of an adjacent sensing electrode of the sensing electrode, to obtain a first processing result comprising a plurality of values, and comparing a maximum value of the first processing result with a preset first threshold; and
if the maximum value is greater than the preset first threshold, determining that there is noise interference at the current operating frequency point;
wherein the obtaining a noise of each sensing electrode of a plurality of sensing electrodes of a touch screen at a current operating frequency point, comprises:
turning off a driving signal, and sampling signals received by the sensing electrodes; and
performing demodulation and integration on the signals obtained from the sensing electrodes by sampling to obtain the noises of the sensing electrodes at the current operating frequency point.

2. The method according to claim 1, wherein the method further comprises:
obtaining noises of the sensing electrodes of the touch screen at the current operating frequency point before the touch screen is driven for a first time, the noises of the sensing electrodes are taken as the current noise references of the sensing electrodes.

3. The method according to claim 1, wherein the performing demodulation and integration on the signals obtained from the sensing electrodes by sampling to obtain the noises of the sensing electrodes at the current operating frequency point, comprises:
performing, by using a demodulation signal, demodulation on a signal obtained from each sensing electrode by sampling to obtain a demodulated signal, wherein a phase difference between the signal obtained by sampling and the demodulation signal is $\pi/2$; and
performing integration on the demodulated signals to obtain the noises of the sensing electrodes at the current operating frequency.

4. The method according to claim 3, wherein the performing, for each sensing electrode respectively, differential processing on the noise difference of the sensing electrode and a noise difference of an adjacent sensing electrode of the sensing electrode, to obtain a first processing result comprising a plurality of values, comprises:
calculating, for each sensing electrode respectively, a difference between noise differences of the sensing electrode and an adjacent sensing electrode to obtain the first processing result, wherein the adjacent sensing electrode is located on a fixed side of the sensing electrode.

5. The method according to claim 1, wherein the performing demodulation and integration on the signals obtained from the sensing electrodes by sampling to obtain the noises of the sensing electrodes at the current operating frequency point, comprises:
performing, by using a demodulation signal corresponding to an I component and a demodulation signal corresponding to a Q component, IQ demodulation on a signal obtained from each sensing electrode by sampling, wherein a phase difference between the demodulation signal corresponding to the I component and the demodulation signal corresponding to the Q component is $\pi/2$; and
respectively performing integration on I component signals and Q component signals corresponding to the sensing electrodes obtained after the demodulation to obtain the noises of the sensing electrodes at the current operating frequency point, wherein the noises of the sensing electrodes comprise I component noises and Q component noises.

6. The method according to claim 5, wherein the noise reference comprises an I component reference and a Q component reference; and the calculating a difference between a noise of each sensing electrode and a current noise reference of that sensing electrode to obtain noise differences of the sensing electrodes, comprises:
calculating a difference between an I component noise of each sensing electrode and an I component reference of the current noise reference of that sensing electrode to obtain I component noise differences of the sensing electrodes; and
calculating a difference between an Q component noise of each sensing electrode and an Q component reference of the current noise reference of that sensing electrode to obtain Q component noise differences of the sensing electrodes;
the performing differential processing on the noise differences of the sensing electrodes for adjacent sensing electrodes to obtain a first processing result, comprises:
calculating, for each sensing electrode, a difference between I component noise differences of that sensing electrode and an adjacent sensing electrode and a difference between Q component noise differences of that sensing electrode and an adjacent sensing electrode, respectively, to obtain a differential result of that sensing electrode, wherein the differential result comprises an I component result and a Q component result, and wherein the adjacent sensing electrode is located on a fixed side of that sensing electrode; and performing, for each sensing electrode, a square root calculation on a squared sum of the I component result and the Q component result of that sensing electrode to obtain the first processing result.

7. The method according to claim 1, wherein after the obtaining noises of sensing electrodes of a touch screen at a current operating frequency point during an operation of the touch screen, the method further comprises:
  detecting, for each sensing electrode, a noise variation amplitude of that sensing electrode; and
  if the noise variation amplitude of that sensing electrode is within a preset range, taking the noise of that sensing electrode obtained this time as the current noise reference of that sensing electrode.

8. The method according to claim 7, wherein the detecting, for each sensing electrode, a noise variation amplitude of that sensing electrode, comprises:
  calculating, for each sensing electrode, a difference between noises of that sensing electrode obtained this time and a last time to obtain noise variations of the sensing electrodes;
  performing differential processing on the noise variations of the sensing electrodes for adjacent sensing electrodes to obtain a second processing result, and taking a maximum value of the second processing result as a noise variation result obtained this time; and
  returning to perform the step of obtaining noises of sensing electrodes of a touch screen at a current operating frequency point during an operation of the touch screen, until it is detected that the obtained noise variation result is less than a preset second threshold for continuous M times, and determining that the noise variation amplitude of that sensing electrode is within a preset range, wherein M is a preset positive integer.

9. The method according to claim 1, wherein the method further comprises:
  obtaining noises of the sensing electrodes of the touch screen at a plurality of pre-selected frequency points if there is noise interference at the current operating frequency point;
  calculating, for each frequency point, a difference between a noise of each sensing electrode at the frequency point and the current noise reference of that sensing electrode to obtain noise differences of the sensing electrodes, and performing differential processing on the noise differences of the sensing electrodes for adjacent sensing electrodes to obtain a processing result, and taking a maximum value of the processing result as a noise amount of the frequency point; and
  updating the current operating frequency point to be a frequency point with a smallest noise amount among the plurality of frequency points.

10. A noise detecting apparatus, comprising:
  a memory, a processor, and a computer program stored on the memory and operable on the processor,
  wherein the processor, when running the computer program, is configured to:
  obtain a noise of each sensing electrode of a plurality of sensing electrodes of a touch screen at a current operating frequency point during an operation of the touch screen;
  calculate, for each sensing electrode respectively, a difference between the noise of the sensing electrode and a current noise reference of the sensing electrode, to obtain a noise difference of the sensing electrode;
  perform, for each sensing electrode respectively, differential processing on the noise difference of the sensing electrode and a noise difference of an adjacent sensing electrode of the sensing electrode, to obtain a first processing result comprising a plurality of values, and compare a maximum value of the first processing result with a preset first threshold; and
  determine that there is noise interference at the current operating frequency point if the maximum value is greater than the preset first threshold;
  wherein the processor is further configured to:
  turn off a driving signal, and sample signals received by the sensing electrodes; and
  perform demodulation and integration on the signals obtained from the sensing electrodes by sampling to obtain the noises of the sensing electrodes at the current operating frequency point.

11. The apparatus according to claim 10, wherein the processor is further configured to obtain the noises of the sensing electrodes of the touch screen at the current operating frequency point before the touch screen is driven for a first time, the noises of the sensing electrodes are taken as the current noise references of the sensing electrodes.

12. The apparatus according to claim 10, wherein the processor is further configured to:
  perform, by using a demodulation signal, demodulation on a signal obtained from each sensing electrode by sampling to obtain a demodulated signal, wherein, a phase difference between the signal obtained by sampling and the demodulation signal is $\pi/2$; and
  perform integration on the demodulated signals to obtain the noises of the sensing electrodes at the current operating frequency.

13. The apparatus according to claim 12, wherein the processor is configured to calculate, for each sensing electrode respectively, a difference between the noise difference of the sensing electrode and the noise difference an adjacent sensing electrode of the sensing electrode, to obtain the first processing result comprising a plurality of values, wherein the adjacent sensing electrode is located on a fixed side of that sensing electrode.

14. The apparatus according to claim 10, wherein the processor is further configured to:
  perform, by using a demodulation signal corresponding to an I component and a demodulation signal corresponding to a Q component, IQ demodulation on a signal obtained from each sensing electrode by sampling, wherein a phase difference between the demodulation signal corresponding to the I component and the demodulation signal corresponding to the Q component is $\pi/2$;
  respectively perform integration on I component signals and Q component signals corresponding to the sensing electrodes obtained after the demodulation to obtain the noises of the sensing electrodes at the current operating frequency point, wherein the noises of the sensing electrodes comprise I component noises and Q component noises.

15. The apparatus according to claim 14, wherein the noise reference comprises an I component reference and a Q component reference; and the processor is further configured to:
  calculate a difference between an I component noise of each sensing electrode and an I component reference of the current noise reference of that sensing electrode to obtain I component noise differences of the sensing electrodes;
  calculate a difference between an Q component noise of each sensing electrode and an Q component reference of the current noise reference of that sensing electrode to obtain Q component noise differences of the sensing electrodes;

calculate, for each sensing electrode respectively, a difference between I component noise differences of that sensing electrode and an adjacent sensing electrode and a difference between Q component noise differences of that sensing electrode and an adjacent sensing electrode, respectively, to obtain a differential result of that sensing electrode, wherein the differential result comprises an I component result and a Q component result, and wherein the adjacent sensing electrode is located on a fixed side of that sensing electrode; and perform, for each sensing electrode respectively, a square root calculation on a squared sum of the I component result and the Q component result of that sensing electrode to obtain the first processing result.

16. The apparatus according to claim 10, wherein the processor is further configured to:

after the noises of the sensing electrodes of the touch screen at the current operating frequency point during the operation of the touch screen are obtained, detect, for each sensing electrode, a noise variation amplitude of that sensing electrode; and if the noise variation amplitude of that sensing electrode is within a preset range, take the noise of that sensing electrode obtained this time as the current noise reference of that sensing electrode.

17. The apparatus according to claim 16, wherein the processor is further configured to:

calculate, for each sensing electrode respectively, a difference between the noise of the sensing electrode obtained this time and a last time to obtain a noise variations of the sensing electrodes;

perform differential processing on the noise variations of the sensing electrodes and a noise variations of an adjacent sensing electrode of the sensing electrode, to obtain a second processing result comprising a plurality of values, and take a maximum value of the second processing result as a noise variation result obtained this time; and perform the step of obtaining a noise of each sensing electrode of a plurality of sensing electrodes of a touch screen at a current operating frequency point during an operation of the touch screen, until it is detected that the obtained noise variation result is less than a preset second threshold for continuous M times, and determine that the noise variation amplitude of that sensing electrode is within a preset range, wherein M is a preset positive integer.

18. The apparatus according to claim 10, wherein the processor is further configured to:

obtain a noise of each sensing electrode of a plurality of sensing electrodes of the touch screen at a plurality of pre-selected frequency points if there is noise interference at the current operating frequency point;

calculate, for each frequency point, a difference between a noise of each sensing electrode at the frequency point and the current noise reference of the sensing electrode to obtain a noise difference of the sensing electrode, and perform differential processing on the noise difference of the sensing electrode and a noise difference of an adjacent sensing electrode of the sensing electrode, to obtain a processing result comprising a plurality of values, and take a maximum value of the processing result as a noise amount of that frequency point; and update the current operating frequency point to be a frequency point with a smallest noise amount among the plurality of frequency points.

* * * * *